United States Patent
Makino et al.

(10) Patent No.: US 8,040,379 B2
(45) Date of Patent: Oct. 18, 2011

(54) IMAGING APPARATUS AND RECORDING MEDIUM

(75) Inventors: Tetsuji Makino, Ome (JP); Shinichi Matsui, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 548 days.

(21) Appl. No.: 12/258,542

(22) Filed: Oct. 27, 2008

(65) Prior Publication Data

US 2009/0135270 A1 May 28, 2009

(30) Foreign Application Priority Data

Nov. 22, 2007 (JP) ................. 2007-302768

(51) Int. Cl.
*H04N 5/228* (2006.01)
*H04N 5/225* (2006.01)

(52) U.S. Cl. ................. 348/208.16; 348/169

(58) Field of Classification Search .............. 348/220.1, 348/155, 169, 208.99, 208.14, 208.16, 222.1
See application file for complete search history.

(56) References Cited

U.S. PATENT DOCUMENTS

| | | | | |
|---|---|---|---|---|
| 5,103,254 A | * | 4/1992 | Bell et al. ............... | 396/147 |
| 7,925,051 B2 | * | 4/2011 | Gensolen et al. ....... | 382/107 |
| 2004/0239776 A1 | * | 12/2004 | Shinohara et al. ...... | 348/239 |

FOREIGN PATENT DOCUMENTS

| | | |
|---|---|---|
| JP | 2-117276 A | 5/1990 |
| JP | 4-213973 A | 8/1992 |
| JP | 10-079881 A | 3/1998 |
| JP | 2001-235782 A | 8/2001 |
| JP | 2006-067452 A | 3/2006 |

OTHER PUBLICATIONS

Japanese Office Action dated Sep. 8, 2009 and English translation thereof issued in a counterpart Japanese Application No. 2007-302768.

* cited by examiner

*Primary Examiner* — David Ometz
*Assistant Examiner* — Ahmed A Berhan
(74) *Attorney, Agent, or Firm* — Holtz, Holtz, Goodman & Chick, P.C.

(57) ABSTRACT

As shown in FIG. 2B, a photographing area is divided into a plurality of blocks. The block at the center of the photographing area is defined as an observation block 31, and the blocks at the periphery of the photographing area are defined as background blocks 32. When the number of background blocks 32 having the largest number of identical motion vectors is larger than a threshold m, when the scalar quantity of the motion vectors of these background blocks 32 with the largest number is larger than a threshold v, and when the scalar quantity of the motion vector of the observation block 31 is smaller than a threshold vc, the digital camera 1 judges that the user is performing a follow shot and there is no blurring of the observed photographic subject, and performs an automatic shooting.

7 Claims, 4 Drawing Sheets

IMAGING APPARATUS AND RECORDING MEDIUM

CROSS-REFERENCE TO RELATED APPLICATION

This application is based upon and claims the benefit of priority from the prior Japanese Patent Application No. 2007-302768, filed Nov. 22, 2007, the entire contents of which is incorporated herein by reference.

BACKGROUND OF THE INVENTION

1. Field of the Invention

The present invention relates to an imaging apparatus and a program thereof, and particularly, relates to an imaging apparatus having an automatic shooting function and a program thereof.

2. Description of the Related Art

Conventionally, digital cameras equipped with an automatic shooting function have been devised.

For example, Japanese Laid-Open (Kokai) Patent Application 2001-235782 discloses an art which, when a detected angular velocity or angular acceleration of a camera satisfies a certain condition, judges that a follow shot (i.e., a shooting technique in which a user shoots a moving subject while moving the camera) is being performed, and automatically shoots an image.

SUMMARY OF THE INVENTION

In accordance with one aspect of the present invention, there is provided an imaging apparatus comprising: an imaging element; a motion vector detecting section which detects motion vectors based on an image data imaged by the imaging element; a judging section which judges whether or not motion vectors in a first region of the image data detected by the motion vector detecting section satisfy a first condition, and motion vectors in a second region of the image data detected by the motion vector detecting section satisfy a second condition; and an automatic shooting control section which controls the imaging element to automatically shoot a still image, when judged by the judging section that the motion vectors in the first region satisfy the first condition and the motion vectors in the second region satisfy the second condition.

In accordance with another aspect of the present invention, there is provided a computer-readable storage medium having an imaging processing program stored thereon that is executable by a computer that includes an imaging element to perform functions comprising: a first process which detects motion vectors based on an image data imaged by the imaging element; a second process which judges whether or not motion vectors in a first region of the image data detected by the first process satisfy a first condition, and motion vectors in a second region of the image data detected by the first process satisfy a second condition; and a third process which automatically shoots a still image by the imaging element, when judged by the second process that the motion vectors in the first region satisfy the first condition and the motion vectors in the second region satisfy the second condition.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings as an example of application of the imaging apparatus of the present invention to a digital camera.

[Embodiment]

A. Configuration of the Digital Camera

Figure 1:
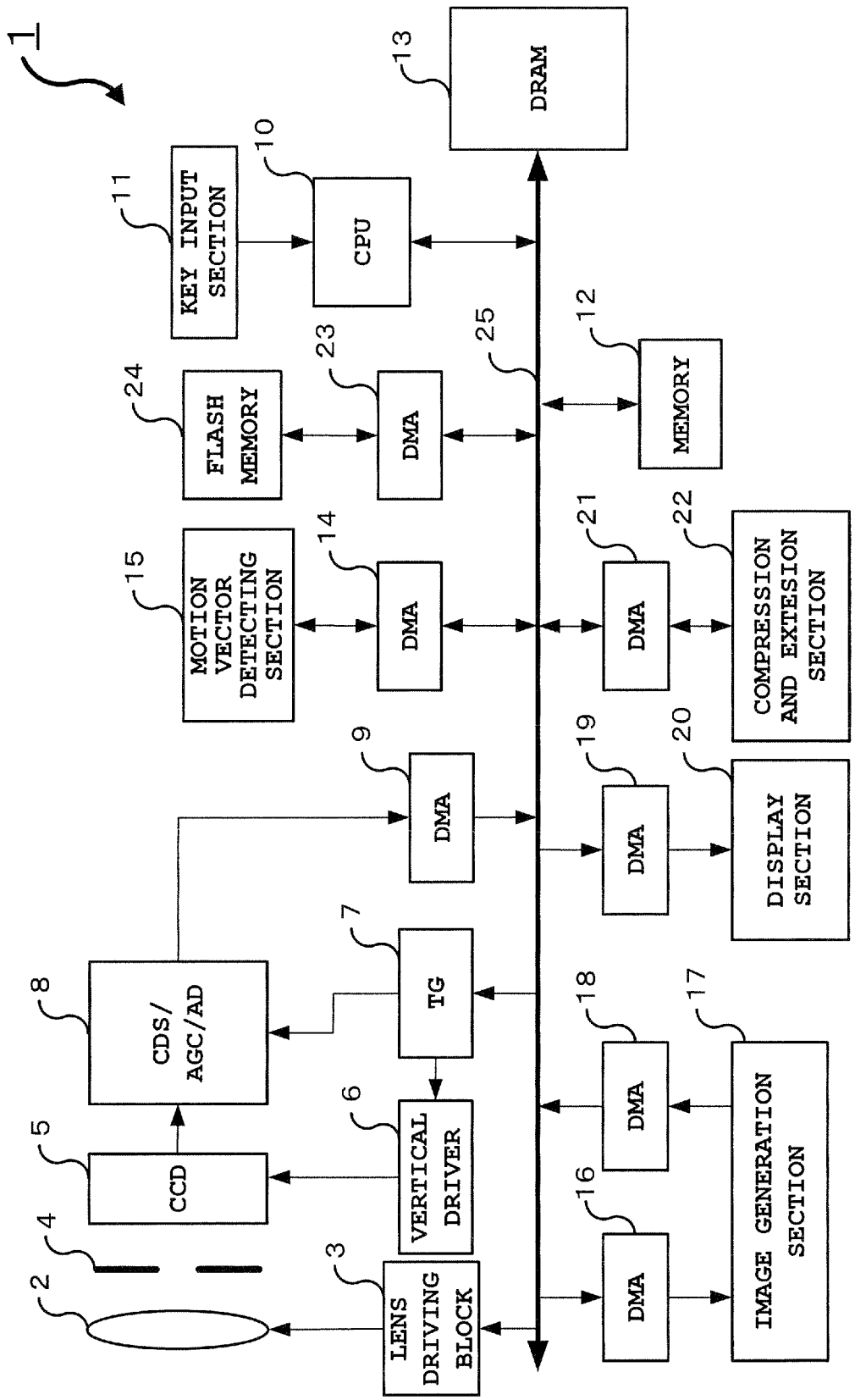
FIG. 1 is a block diagram of a digital camera according to an embodiment of the present invention.

FIG. 1 is a block diagram showing an electric schematic of a digital camera 1 according to the present embodiment.

The digital camera 1 includes an imaging lens 2, a lens driving block 3, a shutter-aperture 4, a charge-coupled device (CCD) 5, a vertical driver 6, a timing generator (TG) 7, a unit circuit 8, a direct memory access (DMA) controller (hereinafter referred to as "DMA") 9, a central processing unit (CPU) 10, a key input section 11, a memory 12, a dynamic random access memory (DRAM) 13, a DMA 14, a motion vector detecting section 15, a DMA 16, an image generating section 17, a DMA 18, a DMA 19, a display section 20, a DMA 21, a compression and extension section 22, a DMA 23, a flash memory 24, and a bus 25.

The imaging lens 2 includes a focus lens and a zoom lens consisting of a plurality of lens groups not shown, and is connected with the lens driving block 3. The lens driving block 3 includes a focus motor, a zoom motor (which are not shown), a focus motor driver and a zoom motor driver (which are not shown). The focus motor and the zoom motor respectively drive the focus lens and the zoom lens in the optical axis direction. The focus motor driver and the zoom motor driver respectively drive the focus motor and the zoom motor in adherence to a control signal sent from the CPU 10.

The shutter-aperture 4 includes a driver circuit not shown. The driver circuit activates the shutter-aperture 4 in adherence to a control signal sent from the CPU 10. The shutter-aperture functions as an aperture and a shutter.

The aperture refers to a mechanism that controls an amount of light irradiated from the imaging lens 2. The shutter refers to a mechanism that controls a period of time during which light is irradiated to the CCD 5. The period of time during which light is irradiated to the CCD 5 varies depending on a speed at which the shutter is opened and closed (that is, shutter speed). The exposure can be determined based on the aperture and the shutter speed.

The CCD 5 is driven for scanning by the vertical driver 6, and after photo-electrically converting the light intensity of the respective colors in the RGB value of a photographic subject image to an imaging signal at a constant cycle, and outputs the imaging signal to the unit circuit 8. The CPU 10 controls the operation timings of the vertical driver 6 and the unit circuit 8 via the TG 7. Note that the CCD 5 has the color filters of Bayer array, and also has a function of an electronic shutter. The CPU 10 controls the shutter speed of the electronic shutter via the vertical driver 6 and the TG 7.

The TG 7 is connected to the unit circuit 8. The unit circuit 8 includes a correlated double sampling (CDS) circuit, an automatic gain control (AGC) circuit, and an analog-to-digital (A/D) converter. The CDS circuit performs correlated double sampling on an imaging signal outputted from the CCD 5 and holds the sampled imaging signal. The AGC circuit performs automatic gain control on the sampled imaging signal. The A/D converter converts the automatic-gain-controlled analog imaging signal to a digital signal. The imaging signal outputted from the CCD 5 is stored in a state of Bayer data in the buffer memory (DRAM 13), via the unit circuit 8.

The CPU 10 is a one-chip microcomputer having a function that performs AE processing, AF processing, imaging processing and the like, and controls each section of the digital camera 1. The CPU 10 also includes a clock circuit which clocks date and time.

Particularly, the CPU 10 has following three functions: a function of judging whether or not the number of background blocks having the largest number of identical motion vectors is larger than a threshold m and whether or not the scalar quantity of the motion vectors of these background blocks with the largest number is larger than a threshold v; a function of judging whether or not the scalar quantity of the motion vector-of an observation block is smaller than a threshold vc; and a function of automatically shooting a still image when judged that the number of background blocks having the largest number of identical motion vectors is larger than the threshold m and the scalar quantity of the motion vectors of these background blocks with the largest number is larger than the threshold v, and also judged that the scalar quantity of the motion vector of the observation block is smaller than the threshold vc.

Note that explanation will be given later on the background blocks and the observation block. The positions of the background blocks and the observation block are closely related to a follow shot.

The key input section 11 includes a plurality of operation keys such as a shutter button enabling both half-depression and full-depression, and a mode selection key, and outputs operational signals that correspond to the key operations performed by the user to the CPU 10.

The memory 12 stores a control program required for the CPU 10 to control each section of the digital camera 1 and necessary data (the threshold m, the threshold v, the threshold vc, etc.), and the CPU 10 operates in accordance with the program.

The DRAM 13 is used as a buffer memory for temporarily storing image data imaged by the CCD 5, and also used as a working memory of the CPU 10.

The DMA 14 reads out Bayer data or luminosity color-difference signal image data to be described later which has been stored in the buffer memory, and outputs it to the motion vector detecting section 15.

The motion vector detecting section 15 detects motion vectors of a certain area in frame image data. The motion vectors in the image data is detected by the representative point matching method, the block matching method, or the like.

In the present embodiment, imaged frame image data (the present frame image data) is divided into a plurality of blocks (m pixels×n pixels each). Then, based on the image data of the respective divided blocks (respective areas) and on frame image data (the preceding frame image data) imaged before the present frame image data, the motion vectors of the respective blocks are detected. Accordingly, a memory circuit for holding imaged frames for a certain period of time is also included in the motion vector detecting section 15.

The motion vector detecting section 15 herein detects motion vectors only of background blocks and an observation block among all image data of the respective divided blocks, whereby the load of the motion vector detecting process can be reduced. Note that the detected motion vectors are sent to the CPU 10 via the DMA 14.

The DMA 16 reads out image data in Bayer data format stored in the buffer memory (DRAM 13), and outputs it to the image generating section 17.

The image generating section 17 executes processing such as pixel interpolation processing, gamma correction processing, and white balance processing on image data sent from the DMA 16, and also generates luminosity color difference signals (YUV data). In short, the image generating section 17 executes image processing.

The DMA 18 stores, in the buffer memory, luminosity color-difference signal image data (YUV data) on which image processing has been performed in the image generating section 17.

The DMA 19 outputs image data in YUV data format stored in the buffer memory to the display section 20.

The display section 20 includes a color LCD and a driver circuit thereof, and displays the image of image data outputted from the DMA 19.

The DMA 21 outputs image data in YUV data format and compressed image data stored in the buffer memory to the compression and extension section 22. It also stores image data compressed and extended by the compression and extension section 22 in the buffer memory.

The compression and extension section 22 is a section that performs compression and extension (for example, compression and extension in a Joint Photographic Experts Group (JPEG) format or a Moving Picture Experts Group (MPEG) format, etc.) of image data.

The DMA 23 reads out compressed image data stored in the buffer memory and stores it in the flash memory 24. It also stores compressed image data stored in the flash memory 24 in the buffer memory.

B. Follow Shot Relationship Between an Observation Block and Background Blocks

"Follow shot" in the present embodiment refers to a shooting technique in which the user shoots a moving observed photographic subject while moving the digital camera 1.

When the user performs a follow shot, the user usually moves the digital camera 1 along with the movement of an observed photographic subject, so that the observed photographic subject is positioned at the center of the photographing area. Therefore, the observed photographic subject should exist at the center of the photographing area substantially in a fixed state, and the background should be moving in a direction opposite to the direction to which the observed photographic subject is moving.

Accordingly, the motion vectors of the background should be directed in one direction, and the motion vector of the observed photographic subject should be different from the motion vectors of the background (that is, the motion vectors of the background and the motion vector of the observed photographic subject have clearly different direction and quantity). Note that in the case where the user accurately captures the observed photographic subject at the center of the photographing area, the motion vector of the observation block should be substantially 0.

Figure 2A:
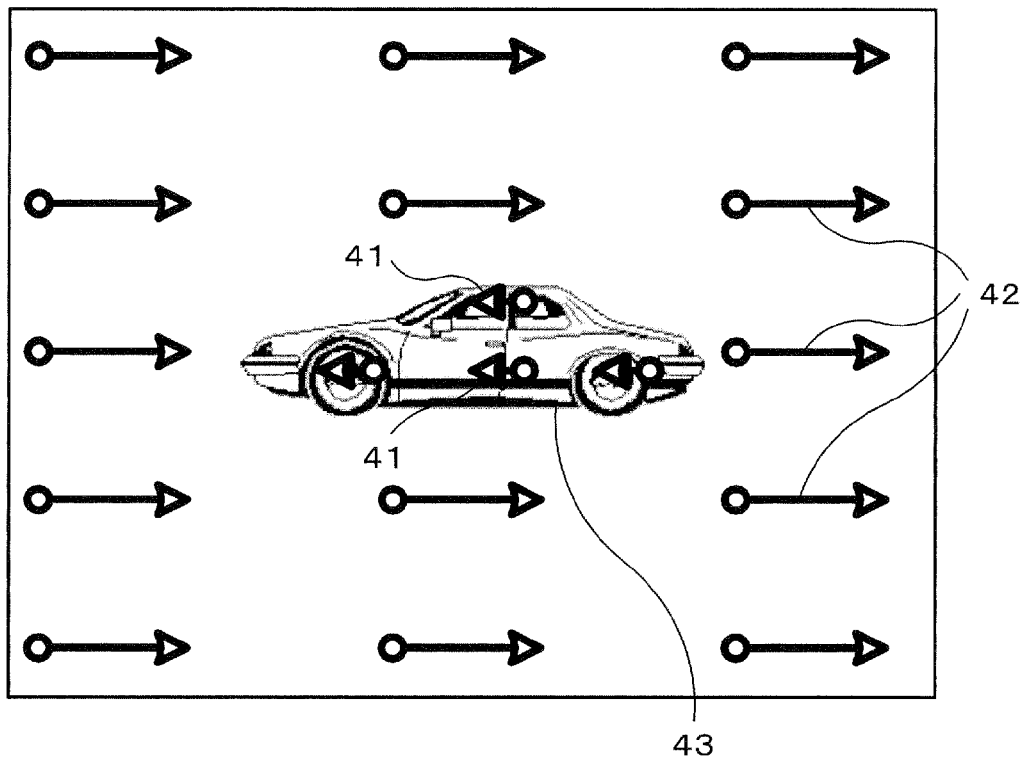
FIG. 2A is a diagram showing motion vectors that are detected when a user is attempting to perform a follow shot by moving the digital camera 1 toward the left while a through image is being displayed.

FIG. 2A is a diagram showing one example of the motion vectors detected when the user is attempting to perform a follow shot by moving the digital camera 1 toward the left, while the through image is being displayed. As can be seen from FIG. 2A, the motion vectors of the background 42 (hereinafter referred to as "background motion vectors 42") are directed in one direction, and the motion vector 41 of the observed photographic subject 43 is different from the background motion vectors 42.

Applying this principle, the positions of the observation block 31 and the background blocks 32 are defined.

In other words, because the observed photographic subject 43 is considered to be positioned at the center of the photographing area, the block at the center of the photographing area is defined as the observation block 31. Further, the blocks at the periphery of the photographing area, in which the observed photographic subject 43 is not considered to exist, are defined as the background blocks 42.

Figure 2B:
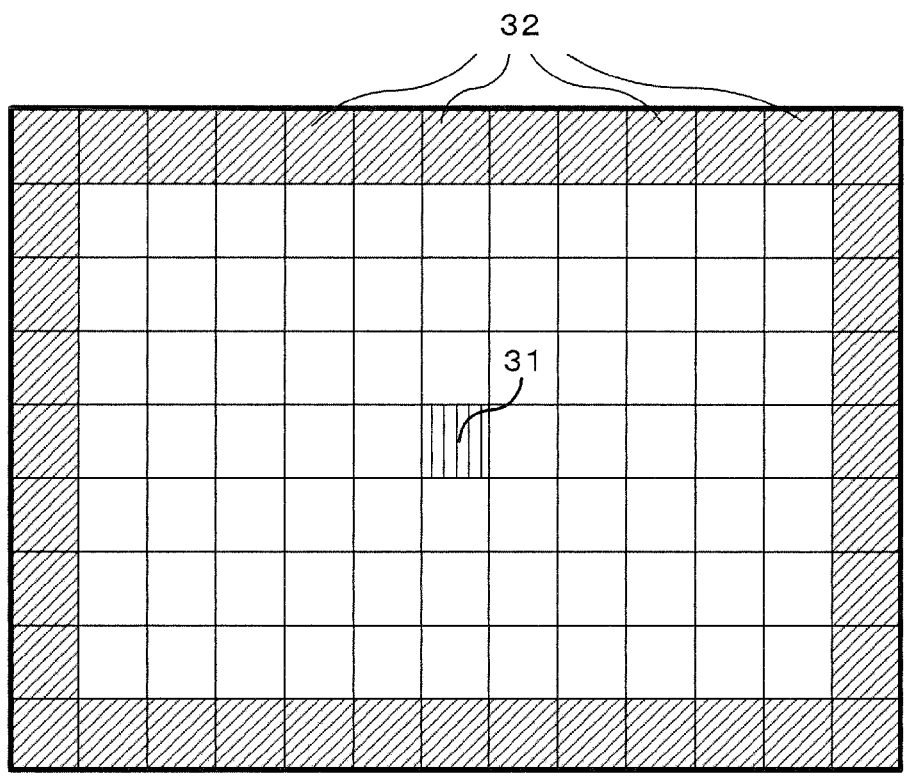
FIG. 2B is a diagram showing one example of an observation block 31 and background blocks 32 in a photographing area.

FIG. 2B is a diagram showing one example of the observation block 31 and the background blocks 32.

As can be seen from FIG. 2B, frame image data is divided into a plurality of blocks. As shown in FIG. 2B, the peripheral blocks 32 (i.e., the blocks shown by hatched lines) at the outermost of the photographing area are defined as the background blocks, and the block 31 (i.e., the block shown by vertical lines) at the center of the photographing area is defined as the observation block. Each of the background blocks 32 is assigned with an address. Since the number of the background blocks 32 is 40 as shown in FIG. 2B, the addresses 1 to 40 are assigned to the respective background blocks 32.

In the case where the number of background blocks 32 having identical motion vectors is larger than the threshold m, and the scalar quantity of the motion vectors 42 of these background blocks 32 is larger than the threshold v, and further, when the scalar quantity of the motion vector 41 of the observation block 31 is smaller than the threshold vc, the digital camera 1 judges that the digital camera 1 is in a state where the user is attempting to perform a follow shot and that there is no blurring of the observed photographic subject, and subsequently performs automatic shooting based on the judgment.

One of the reasons why such judgment is determined as the condition for automatically shooting an image is that, if the scalar quantity of the motion vectors 42 of the background blocks 32 is smaller than the threshold v and the scalar quantity of the motion vector 41 of the observation block 31 is smaller than the threshold vc, it means that the user is not attempting to perform a follow shot, but is merely attempting to shoot a stationary subject with the digital camera 1 fixed. Another reason is that, if the scalar quantity of the motion vectors 42 of the background blocks 32 is larger than the threshold v and the scalar quantity of the motion vector 41 of the observation block 31 is larger than the threshold vc, it means that the user is merely panning the camera to a stationary subject.

Herein, whether or not "the number of background blocks 32 having identical motion vectors is larger than the threshold m" is judged, rather than whether or not "the motion vectors of the background blocks 32 are all identical." This is because, since the user is shooting an image while moving the digital camera 1, the detection of the motion vectors 42 of the background blocks 32 is likely to fail, and thus the motion vectors 42 cannot be always detected accurately in all background blocks 32. For example, in the case where the image of the background blocks 32 of the present frame image data does not exist in the previous frame image data, the detection of the motion vectors 42 of the background blocks 32 will fail.

Note that the observation block 31 is herein defined as the block at the center of frame image data. However, the observation block 31 may be any block in the vicinity of the center. In addition, the background blocks 32 are herein defined as all blocks positioned at the outermost of frame image data. However, the background blocks 32 need not be all blocks at the outermost, or they need not be blocks at the outermost. The point is that, the block in which the subject at the center is thought to definitely exist should be determined as the observation block 31, and the blocks in which the observed photographic subject is thought to not exist and which are thought to be always the backgrounds should be determined as the background blocks 32.

C. Operations of the Digital Camera 1

The operation of the digital camera 1 according to the embodiment will hereinafter be described with reference to flowcharts of FIGS. 3 and 4.

When an auto-follow shot mode is set by the user's operation of the mode selection key in the key input section 11, the CPU 10 starts to image a subject using the CCD 5 at a predetermined frame rate, and starts a so-called through image display (Step S1). In the through image display, the display section 20 displays the frame image data of luminosity color difference signals that have been sequentially generated by the image generating section 17 and stored in the buffer memory (DRAM 13).

Next, the CPU 10 judges whether or not the user has given an instruction to start auto-shuttering (Step S2). This judgment is made based on whether or not an operational signal corresponding to half-depression or full-depression of the shutter button has been sent from the key input section 11. The user performs the half-depression or the full-depression of the shutter button when the user has started a follow shot of the observed photographic subject and thinks that the auto shutter can be released at any time.

When judged at Step S2 that the user has not given an instruction to start auto-shuttering, the CPU 10 stays at Step S2 until an instruction to start auto-shuttering is given. When judged that the user has given an instruction to start auto-shuttering, the CPU 10 acquires a total number a of the background blocks 32 from the memory 12 (Step S3).

Since the background blocks 32 are herein defined as shown in FIG. 2B, the number a of the background blocks 32 to be acquired should be 40.

Next, the CPU 10 outputs the frame image data that have been sequentially imaged to the motion vector detecting section 15, and controls the motion vector detecting section 15 to start detecting the motion vectors of the observation block 31 and of the individual background blocks 32 of each frame image data imaged (Step S4).

Next, the CPU 10 acquires the detected motion vectors of the observation block 31 and of the individual background blocks 32 of the frame image data most recently imaged (Step S5).

Next, the CPU 10 sets as "Reference block n0=1" and "Max=0" (Step S6). "Reference block n0=1" means setting the background block 32 having the address "1" to the reference block n0. The address of the background block 32 set to the reference block n0 is stored in the reference block storage region of the buffer memory.

In addition, "Max" means the largest number of background blocks 32 having identical motion vectors (that is, the largest number of identical motion vectors among all motion vectors of the background blocks 32). "Max=0" means setting the largest number to 0. The set largest number is stored in the Max storage region of the buffer memory.

Next, the CPU 10 judges whether or not the motion vector Vn0 of the set reference block n0 exists in the motion vectors of the blocks acquired at Step S5 (Step S7). In this judgment, the CPU 10 judges whether or not the motion vector of the reference block n0 exists based on the address that is currently stored in the reference block storage region.

In the case where the detection of the motion vector of the background block 32 set as "reference block=n0" by the motion vector detection process fails, the CPU 10 judges that no motion vector of the reference block n0 exists. This is because a motion vector of the background blocks 32 is not always detected.

When judged at Step S7 that the motion vector of the reference block n0 exists, the CPU 10 sets as "Comparison block n1=1", and as "Count=0" (Step S8). "Comparison block n1=1" means setting background blocks 32 having the address 1 to the comparison block n1. The addresses of the background blocks 32 set to the comparison block n1 is stored in comparison block storage region of the buffer memory.

In addition, "Count" means the count number of background blocks 32 having motion vectors identical to the present reference block n0. "Count=0" means setting the count number to 0. The set count number is stored in the Count storage region of the buffer memory.

Next, the CPU 10 judges whether or not the motion vector Vn1 of the set comparison block n1 exists in the motion vectors of the blocks acquired at Step S5 (Step S9). In this judgment, the CPU 10 judges whether or not the motion vector of the set comparison block n1 exists based on the address that is currently stored in the comparison block storage region.

As described above, in the case where the detection of the motion vector of the background blocks 32 set to "reference block=n1" by the motion vector detection process fails, the CPU 10 judges that no motion vector of the set comparison block n1 exists.

When judged at Step S9, that the motion vector Vn1 of the comparison block n1 exists, the CPU 10 compares the motion vector Vn0 of the currently-set reference block n0 with the motion vector Vn1 of the currently-set comparison block n1 so as to judge whether or not the motion vector Vn0 and the motion vector Vn1 are the same (Step S10).

When judged at Step S10 that the motion vector Vn0 and the motion vector Vn1 are the same, the CPU 10 sets the Count to "Count=Count+1" (Step S11), and proceeds to Step S12. In other words, the CPU 10 increments the number of the Counts at Step S11. The incremented number is stored in the Count storage region.

On the contrary, when judged at Step S9 that no motion vector Vn1 of the comparison block n1 exists, or when judged at Step S10 that the motion vector Vn0 and the motion vector Vn1 are not the same, the CPU 10 proceeds to Step S12 without executing other processes.

At Step S12, the CPU 10 judges whether or not the currently-set comparison block n1 is "Comparison block n1=a", that is, whether or not the address number of the background blocks 32 set to the comparison block n1 is the same as the total number a of the background blocks. In other words, the CPU 10 judges whether or not all background blocks 32 have been set as the comparison block n1. This judgment is made based on the address that is currently stored in the comparison block storage region.

When judged at Step S12 that the comparison block n1 is not "comparison block n1=a", the CPU 10 sets the comparison block n1 to "comparison block n1=n1+1" (Step S13), and returns to Step S9.

In other words, the CPU 10 increments the address of the background block 32 to be set as the comparison block n1. For example, in the case where the background block 32 with the address 2 is currently set as a comparison block, the background block 32 with the address 3 should be set as the comparison block. In accordance with this, the address stored in the comparison block storage region is also incremented.

As a result, the CPU 10 compares the motion vector of the background block 32 currently set as the reference block n0 with the motion vectors of all background blocks 32, so as to count the number of background blocks 32 having motion vectors identical to that of the background block 32 set as the reference block n0.

On the contrary, when judged at Step S12 that the comparison block n1 is "comparison block n1=a", that is, when judged that the CPU 10 has set all background blocks 32 as the comparison block n1, the CPU 10 judges whether or not the Count is larger than the Max (Step S14). In other words, the CPU 10 judges whether or not the count number stored in the Count storage region is larger than the largest number stored in the Max storage region.

When judged at Step S14 that the Count is larger than the Max, the CPU 10 sets the number of the Count to Max (and stores the count number stored in the Count storage region in the Max storage region), and sets the motion vector Vn0 of the background block 32 currently set as the reference block n0 to the greatest motion vector V in the background blocks 32 (Step S15). Then, the CPU 10 proceeds to Step S16.

By setting the motion vector V, the motion vector of the background block 32 currently set as the reference block n0 overwrites and is stored in the motion vector storage region.

On the contrary, when judged at Step S7 that the motion vector Vn0 of the reference block n0 does not exist, and further judged at Step S14 that the number of the Count is not larger than the Max, the CPU 10 proceeds to Step S16 without executing other processes.

At Step S16, the CPU 10 judges whether or not the currently-set reference block n0=a, in other words, whether or not the address number of the background block 32 currently set to the reference block n0 is the same as the total number a of the background blocks. That is, the CPU 10 judges whether or not all background blocks 32 have been set as the reference block n0. This judgment is made based on the address that is currently stored in the reference block storage region.

When judged at Step S16 that the reference block n0 is not "reference block n0=a", the CPU 10 sets the reference block n0 to "reference block n0=n0+1" (Step S17), and returns to Step S7.

In other words, the CPU 10 increments the address of the background block 32 to be set as the reference block n0. For example, in the case where the background block 32 with the address 2 is currently set as the reference block n0, the background block 32 with the address 3 should be set as the reference block n0. In accordance with this, the address stored in the reference block storage region is also incremented.

As a result, by setting all background blocks 32 as the reference block n0, each of the motion vectors of each background block 32 is compared with the motion vectors of all background blocks 32, whereby the number of background blocks having motion vectors identical to that of each background block 32 is counted. Accordingly, the Count number with the largest count number is set as the Max, and the motion vector which has the largest Count number is set as the motion vector V.

Figure 4:
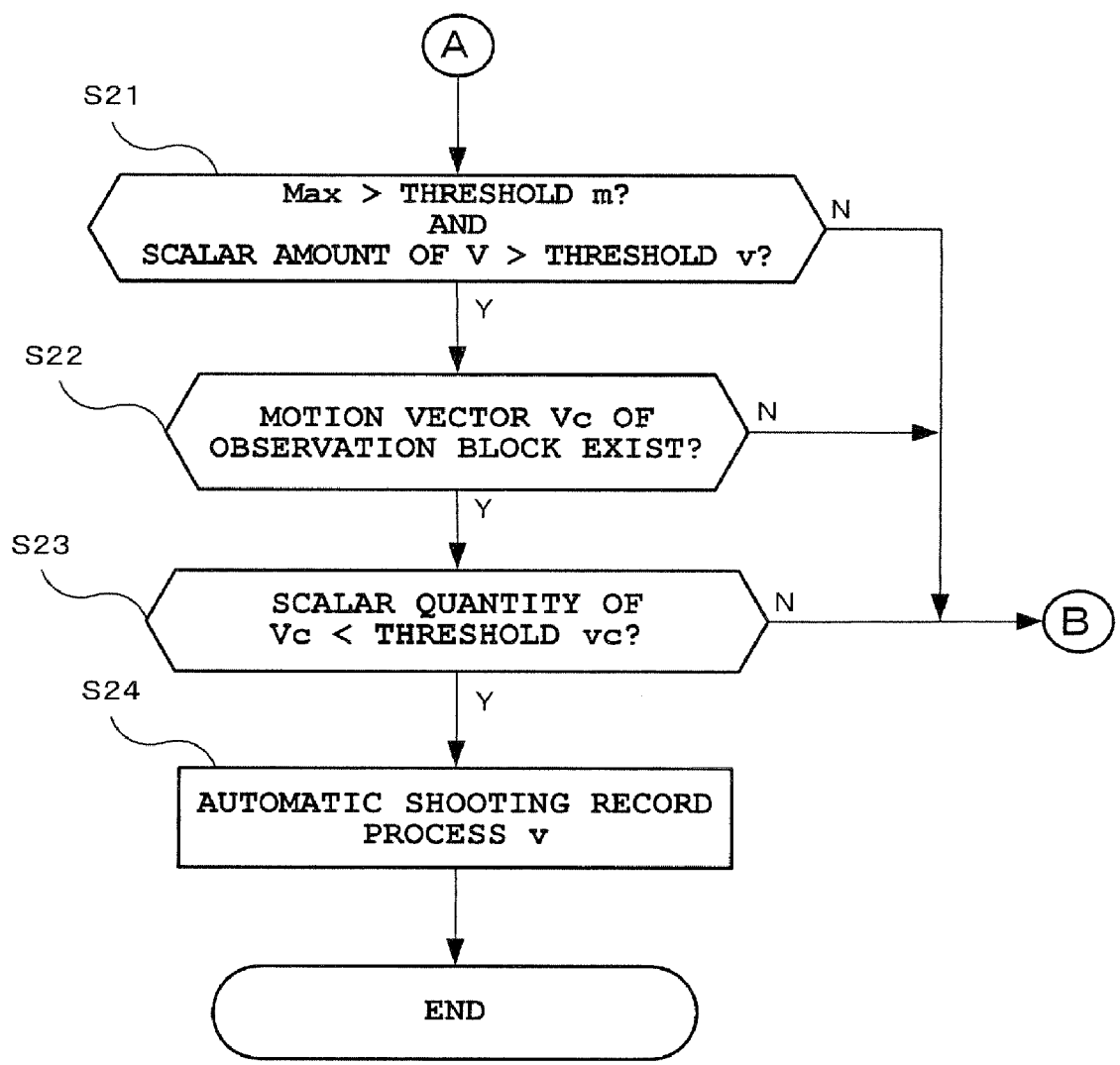
FIG. 4 is a flowchart showing an operation of the digital camera 1 according to the embodiment.

On the contrary, when judged at Step S16 that the reference block n0 is "reference block n0=a", that is, when judged that all background blocks 32 have been set as the reference block n0, the CPU 10 proceeds to Step S21 in FIG. 4. At Step S21, the CPU 10 judges whether or not the currently-set Max is larger than the threshold m, and whether or not the scalar quantity of the currently-set motion vector V is larger than the threshold v. In other words, the CPU 10 judges whether or not the largest number stored in the Max storage region is larger than the threshold m, and whether or not the scalar quantity of the motion vector stored in the motion vector storage region is larger than the threshold v.

Figure 3:
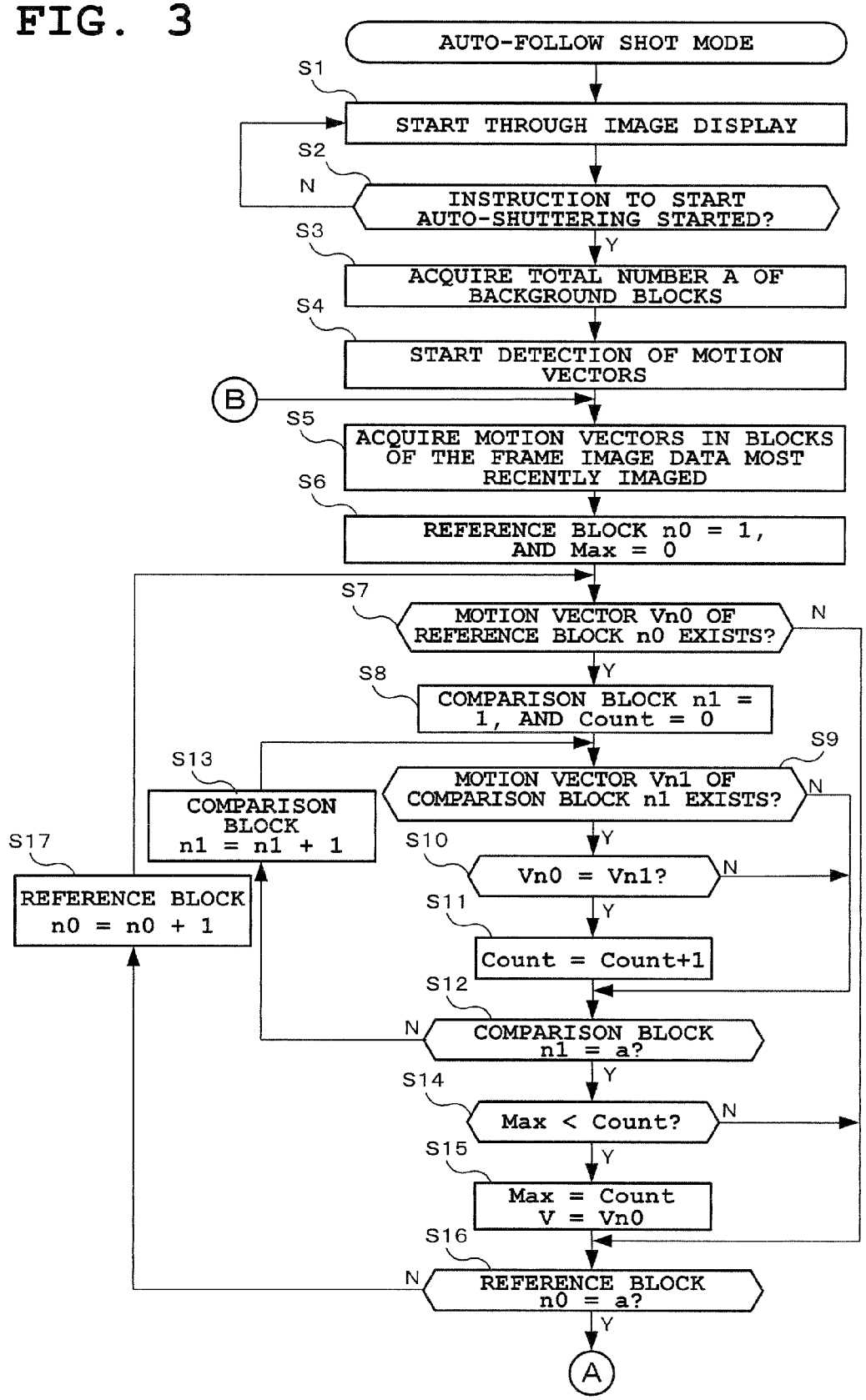
FIG. 3 is a flowchart showing an operation of the digital camera 1 according to the embodiment.

When judged at Step S21 that the currently-set Max is larger than the threshold m, and the scalar quantity of the currently-set motion vector V is larger than the threshold v, the CPU 10 judges whether or not the motion vector Vc of the observation block 31 exists in the motion vectors of the blocks acquired at Step S5 in FIG. 3 (Step S22).

When judged at Step S22 that the motion vector Vc of the observation block 31 exists, the CPU 10 judges whether or not the scalar quantity of the motion vector Vc of the observation block 31 is smaller than the threshold vc (Step S23).

When judged at Step S23 that the scalar quantity of the motion vector Vc of the observation block 31 is smaller than the threshold vc, the CPU 10 performs an automatic shooting record process (follow shot) (Step S24). In other words, even when no operation instruction is given by the user, the CPU 10 automatically performs a still image pick-up record process (follow shot), and records the compressed still image data in the flash memory 24 via the DMA 23.

On the contrary, when judged at Step S21 that the currently-set Max is not larger than the threshold m, or the scalar quantity of the currently-set motion vector V is not larger than the threshold v, when judged at Step S22 that the motion vector Vc of the observation block 31 does not exist, or when judged at Step S23 that the scalar quantity of the motion vector Vc of the observation block 31 is not smaller than the threshold vc, the CPU 10 returns to Step S5 in FIG. 3. Next, the CPU 10 acquires the detected motion vectors of the observation block 31 and of the individual background blocks 32 of the frame image data most recently imaged, and repeats the above-described operations.

In other words, Steps S21 to S23 judge whether or not to automatically shoot an image based on the frame image data most recently imaged.

Note that the motion vector detecting section 15 computes the motion vectors of the blocks of the frame image data most recently imaged, before the reading out of the next frame image data from the CCD 5 is completed. In addition, the processes at Steps S5 to S23 in FIG. 3 should also be completed before the reading out of the next frame image data from the CCD 5 is completed. In other words, the CPU 10 judges whether or not to automatically shoot an image for each frame image data imaged.

As described above, according to the embodiment, image data is divided into a plurality of blocks. The block at the center of the photographing area is defined as an observation block 31, and the blocks at the periphery of the photographing area are defined as the background blocks 32. In addition, an automatic shooting is performed, when the largest number (Max) of identical motion vectors among the motion vectors of the background blocks 32 is larger than the threshold m, when the scalar quantity of the motion vector with the largest number of the identical motion vectors is larger than the threshold v, and when the scalar quantity of the motion vector of the observation block 31 is smaller than the threshold vc. This enables a follow shot to be automatically performed with no or little blurring of the observed photographic subject.

Further, the observation block 31 is defined as the center of a photographing area, and the background blocks 32 are defined as the peripheral blocks of the photographing area. This enables the motion vectors of the observed photographic subject and of the background to be detected with high accuracy, and also enables the judgment of whether or not the user is attempting to perform a follow shot with high accuracy, and whether or not there is no blurring of the observed photographic subject.

Furthermore, the CPU 10 judges whether or not the largest number of identical motion vectors (Max) among all motion vectors of the background blocks 32 is larger than the threshold m, whether or not the scalar quantity of the motion vector with the largest number of the identical motion vectors is larger than the threshold v, and whether or not the scalar quantity of the motion vector of the observation block is smaller than the threshold vc. This enables the judgment of whether or not the user is attempting to perform a follow shot with high accuracy in a state where there is no blurring of the observed photographic subject.

[Modifications]

The following variation example of the embodiment as described above is possible.

(01) According to the above-described embodiment, whether or not the largest number of identical motion vectors among all motion vectors of the background blocks 32 (the largest number of background blocks 32 having identical motion vectors) is larger than the threshold m, and whether or not the scalar quantity of the motion vector with the largest number of the identical motion vectors is larger than the threshold v are judged. However, it is only required that whether or not the scalar quantity of the motion vectors of the background region (the region shown by hatched line in FIG. 2B) consisting of the background blocks 32 is larger than the threshold v is judged. This also enables a follow shot to be automatically performed with no or little blurring of the observed photographic subject.

The motion vectors of this background region may be, for example, a mean motion vector of the individual motion vectors of the background blocks 32 or a motion vector with the number of identical motion vectors larger than the threshold m. In other words, according to the above-described embodiment, the motion vector should be a motion vector with the largest number of identical motion vectors. However, the motion vector need not be a motion vector with the largest number of identical motion vectors, as long as the number of the identical motion vectors is larger than the threshold m.

(02) According to the above-described embodiment, the block at the center of a photographing area is set as the observation block 31 (observation region). However, an optional region may be set as the observation region by the user's operation of the key input section 11. In addition, according to the above-described embodiment, the peripheral region of the photographing area is set as the background region, and the background blocks 32 are determined based on the background region. However, a optional region may be set as the background region by the user's operation of the key input section 11. In this case, the blocks that exist in this set background region should be defined as the background blocks 32. In some cases, when performing a follow shot, the user prefers to image the observed photographic subject in a region other than the center of the photographing area. In such cases, by optionally setting the observation region and the background region by the user's operation, it is possible to automatically perform a follow shot with higher accuracy and with no or little blurring of the observed photographic subject.

(03) According to the above-described embodiment, the threshold m, the threshold v and the threshold vc are predetermined values. However, optional values may be set as the threshold m, the threshold v, or the threshold vc by the user's operation of the key input section 11. This enables the user to optionally determine the blurring degree of an observed photographic subject and the blurring degree of the background in automatic follow shot.

(04) According to the above-described embodiment, whether or not the scalar quantity of the motion vector Vc of the observation block 31 is smaller than the threshold vc is judged, after whether or not the largest number of identical motion vectors among all motion vectors of the background blocks 32 (the largest number of background blocks 32 having identical motion vectors) is larger than the threshold m and whether or not the scalar quantity of the motion vector with the largest number of the identical motion vectors is larger than the threshold v are judged. However, the judgment may be made in reverse order.

In this case, the operations at Steps S22 and S23 in FIG. 4 are inserted between Steps S5 and S6 in FIG. 3. When negative judgments are made at Steps S22 and S23, the CPU 10 returns to Step S5, and when a positive judgment is made at Step S23, the CPU 10 proceeds to Step S6. In addition, when a negative judgment is made at Step S21, the CPU 10 returns to Step S5, and if a positive judgment is made at Step S21, the CPU 10 proceeds to Step S24.

(05) According to the above-described embodiment, each of the background blocks 32 is set as the reference block n0, and each background block 32 is compared with all background blocks 32 so as to count the number of identical motion vectors. However, this leads to redundant judgments. Therefore, the background blocks 32, which have been set as the comparison block n1 judged to have motion vectors identical to those of the background blocks 32 set as the reference block n0, may not be set as the reference block n0.

It is only required that the individual background blocks 32 are grouped for each motion vector, and the number of background blocks 32 in the group having the largest number of background blocks 32, may be set as the Max.

(06) According to the above-described embodiment, the number of the observation block 31 is one. However, a plurality of, that is, two or more observation blocks 31 may be used. It is only required that the observation block 31 exists at the central region of the photographing area, or, in the observation region set by the user.

In this case, at Step S23, as is the case with the background blocks 32, whether or not the largest number of identical motion vectors among all motion vectors of the observation block 31 (that is, the largest number of background blocks 32 having identical motion vectors) is larger than the threshold, and whether or not the scalar quantity of the motion vector with the largest number of the identical motion vectors is smaller than the threshold vc are judged. In addition, at Step S23 in this case, whether or not the scalar quantity of a mean motion vector of each of the observation blocks 31 is smaller than the threshold vc may be judged. Furthermore, at Step S23 in this case, whether or not the scalar quantity of a motion vector of the observation block 31 with the number of identical motion vectors larger than a threshold is smaller than the threshold vc may be judged.

(07) According to the above-described embodiment, whether or not to automatically shoot an image for each frame is judged. However, whether or not to automatically shoot an image for each predetermined frame may be judged.

(08) Furthermore, the above-described embodiment and the above-described modifications (01) to (07) may be optionally combined as the modification.

(09) The individual embodiments of the present invention as described above are merely examples as a best mode for carrying out the invention, and aims to facilitate understanding of the principle and the structure of the present invention. It is not intended to limit the scope of the present invention.

Therefore, it should be construed that various variations and modifications for the above-described embodiments of the present invention be included in the scope of the present invention.

Lastly, in the individual embodiments as described above, a case where an imaging apparatus of the present invention is applied to the digital camera 1 is described. However, the present invention is not limited to the above-described embodiments. In other words, the present invention may be applied to any apparatus as long as it can shoot a photographic subject.

Furthermore, although the processing program of the imaging apparatus which is a preferred embodiment of the present invention is stored in the memory (for example, ROM, etc.) of the imaging apparatus, this processing program is stored thereon a computer-readable medium and should also be protected in the case of manufacturing, selling, etc. of only the program. In that case, the method of protecting the program with a patent will be realized by the form of the computer-readable medium on which the processing program is stored.

While the present invention has been described with reference to the preferred embodiments, it is intended that the invention be not limited by any of the details of the description therein but includes all the embodiments which fall within the scope of the appended claims.

What is claimed is:

1. An imaging apparatus, comprising:
an imaging element;
a motion vector detecting section which detects motion vectors of a background region and a photographic subject region based on image data imaged by the imaging element;
a judging section which judges whether or not motion vectors in the background region detected by the motion vector detecting section satisfy a first condition, and whether or not motion vectors in the photographic subject region detected by the motion vector detecting section satisfy a second condition; and
an automatic shooting control section which controls the imaging element to automatically perform a follow shot, when the judging section judges that the motion vectors in the background region satisfy the first condition and the motion vectors in the photographic subject region satisfy the second condition;
wherein the first condition includes a condition requiring that a number of identical motion vectors of the background region be larger than a third threshold value, and that a quantity of the motion vectors of which the number is larger than the third threshold value be larger than a first threshold value; and
wherein the second condition includes a condition requiring that a quantity of the motion vectors be less than a second threshold value.

2. The imaging apparatus according to claim 1, wherein the first condition requires that a number of motion vectors of the background region that is a largest number of identical motion vectors be larger than the third threshold value, and that a quantity of the identical motion vectors of which the number is the largest be larger than the first threshold value.

3. The imaging apparatus according to claim 1, further comprising a threshold value setting section which optionally sets at least one threshold value among the first threshold value, the second threshold value, and the third threshold value.

4. The imaging apparatus according to claim 1, wherein the background region is a peripheral region of a photographing area, and the photographic subject region is a central region of the photographing area.

5. The imaging apparatus according to claim 1, further comprising a region setting section which optionally sets at least one of the background region and the photographic subject region.

6. The imaging apparatus according to claim 1, wherein the motion vector detecting section detects only motion vectors in the background region and the photographic subject region.

7. A non-transitory computer-readable storage medium having a program stored thereon that is executable by a computer including an imaging element to control the computer to function as elements including:

a motion vector detecting section which detects motion vectors of a background region and a photographic subject region based on image data imaged by the imaging element;

a judging section which judges whether or not motion vectors in the background region detected by the motion vector detecting section satisfy a condition requiring that a number of identical motion vectors be larger than a third threshold value, and that a quantity of the motion vectors of which the number is larger than the third threshold value be larger than a first threshold value, and which further judges whether or not motion vectors in the photographic subject region detected by the motion vector detecting section satisfy a condition requiring that a quantity of the motion vectors be less than a second threshold value; and an automatic shooting control section which controls the imaging element to automatically perform a follow shot, when the judging section judges that the motion vectors in the background region satisfy the condition requiring that the number of identical motion vectors be larger than the third threshold value, and that the quantity of the motion vectors of which the number is larger than the third threshold value be larger than the first threshold value, and that the motion vectors in the photographic subject region satisfy the condition requiring that the quantity of the motion vectors be less than the second threshold value.

* * * * *